(12) United States Patent
Ramesan (10) Patent No.: US 11,620,444 B2
(45) Date of Patent: *Apr. 4, 2023

(54) PROVIDING ACTION ASSOCIATED WITH EVENT DETECTED WITHIN COMMUNICATION

(71) Applicant: Microsoft Technology Licensing, LLC, Redmond, WA (US)

(72) Inventor: Roshin Lal Ramesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/053,109

(22) Filed: Aug. 2, 2018

(65) Prior Publication Data

US 2018/0341633 A1 Nov. 29, 2018

Related U.S. Application Data

(63) Continuation of application No. 15/197,765, filed on Jun. 30, 2016, now Pat. No. 10,073,826.

(51) Int. Cl.
*G06F 40/186* (2020.01)
*H04L 67/02* (2022.01)
(Continued)

(52) U.S. Cl.
CPC ........ *G06F 40/186* (2020.01); *G06F 16/9535* (2019.01); *G06F 40/134* (2020.01);
(Continued)

(58) Field of Classification Search
CPC ............. G06F 16/9535; G06F 17/2785; G06F 17/2235; G06F 17/248; G06F 40/186;
(Continued)

(56) References Cited

U.S. PATENT DOCUMENTS 7,860,803 B1 * 12/2010 Chang .................... G06Q 10/10
235/380
8,384,942 B1 * 2/2013 Shmunis ............... G06Q 10/107
358/1.13

(Continued)

FOREIGN PATENT DOCUMENTS

WO WO-2008061096 A2 * 5/2008 ........... G06Q 10/107

OTHER PUBLICATIONS

Declare Actions; Aug. 13, 2015; developers.google.com; pp. 1-8.*

(Continued)

*Primary Examiner* — Andrew R Dyer (57) ABSTRACT

An action associated with an event detected within a communication is provided. A communication service initiates operations to provide the action by processing a communication to detect an event related to a transaction between a recipient and vendor. An action template is located that matches an event type and the vendor. A vendor service is queried to find the action template. An action is generated by populating the action template with an attribute of the event such as a recipient identifier and/or a transaction identifier. The action is provided to the recipient to facilitate an interaction related to the event with the vendor service.

20 Claims, 8 Drawing Sheets

(51) Int. Cl.
*G06F 16/9535* (2019.01)
*G06F 40/30* (2020.01)
*G06F 40/134* (2020.01)
*H04L 51/234* (2022.01)
*H04L 67/75* (2022.01)
*G06Q 50/30* (2012.01)
*G06Q 30/0601* (2023.01)

(52) U.S. Cl.
CPC ............ *G06F 40/30* (2020.01); *H04L 51/234* (2022.05); *H04L 67/02* (2013.01); *H04L 67/75* (2022.05); *G06Q 30/0641* (2013.01); *G06Q 50/30* (2013.01)

(58) Field of Classification Search
CPC ... G06F 40/134; G06F 40/30; G06Q 30/0641; G06Q 50/30; H04L 51/34; H04L 67/02; H04L 67/36
USPC ........ 715/205, 207, 208, 221, 224, 225, 226
See application file for complete search history.

(56) References Cited

U.S. PATENT DOCUMENTS

| | | | | |
|---|---|---|---|---|
| 8,838,643 | B2* | 9/2014 | El Daher | G06F 16/9535 707/777 |
| 8,886,735 | B1* | 11/2014 | Liu | G06Q 10/107 709/206 |
| 8,903,931 | B1* | 12/2014 | Rothman | H04L 51/22 705/14.35 |
| 8,954,092 | B2* | 2/2015 | Kirmse | G01C 21/362 455/456.3 |
| 9,026,944 | B2* | 5/2015 | Kotler | G06F 3/0482 715/828 |
| 9,043,403 | B2* | 5/2015 | Schnitman | H04L 51/18 709/205 |
| 9,129,264 | B2* | 9/2015 | Lyle | G06Q 10/063116 |
| 9,218,819 | B1* | 12/2015 | Stekkelpak | G10L 15/22 |
| 9,299,063 | B2* | 3/2016 | De | G06Q 10/107 |
| 9,542,365 | B1* | 1/2017 | Rothman | H04L 51/22 |
| 9,582,482 | B1* | 2/2017 | Sharifi | G06F 16/5854 |
| 9,703,541 | B2* | 7/2017 | Sharifi | G06F 8/61 |
| 9,794,208 | B2* | 10/2017 | Shmarovoz | H04L 51/22 |
| 9,929,996 | B2* | 3/2018 | Blinder | H04L 51/22 |
| 9,961,032 | B2* | 5/2018 | Blinder | H04L 51/22 |
| 2001/0042037 | A1* | 11/2001 | Kam | G06Q 20/0855 705/36 R |
| 2004/0204998 | A1* | 10/2004 | Shah | G06Q 30/06 705/16 |
| 2005/0228899 | A1* | 10/2005 | Wendkos | H04L 67/306 709/232 |
| 2006/0047639 | A1* | 3/2006 | King | G06F 16/58 |
| 2007/0171029 | A1* | 7/2007 | Inbarajan | G06Q 10/00 340/425.5 |
| 2009/0248523 | A1* | 10/2009 | Hueter | G06Q 10/00 705/14.53 |
| 2011/0264685 | A1* | 10/2011 | Cheng | G06Q 10/107 707/769 |
| 2011/0270749 | A1* | 11/2011 | Bennett | G06Q 20/102 705/40 |
| 2012/0042024 | A1* | 2/2012 | Kirshenboim | H04L 51/18 709/206 |
| 2012/0117058 | A1* | 5/2012 | Rubinstein | G06F 16/951 707/723 |
| 2012/0166554 | A1* | 6/2012 | Preece | H04L 12/66 709/206 |
| 2012/0197728 | A1* | 8/2012 | Luna | G06Q 30/02 705/14.64 |
| 2013/0007627 | A1* | 1/2013 | Monaco | G06Q 10/107 715/739 |
| 2013/0318172 | A1* | 11/2013 | Liberty | H04L 51/16 709/206 |
| 2014/0082521 | A1* | 3/2014 | Carolan | H04L 51/00 715/752 |
| 2014/0372867 | A1* | 12/2014 | Tidhar | G06F 17/2247 715/234 |
| 2015/0100896 | A1* | 4/2015 | Shmarovoz | H04L 51/22 715/752 |
| 2017/0308517 | A1* | 10/2017 | Josifovski | G06Q 10/10 |

OTHER PUBLICATIONS

Handle Action Requests; Aug. 13, 2015; developers.google.com; pp. 1-3.*
What Are Actions?; Feb. 25, 2015; developers.google.com; pp. 1-6.*
What Are Highlights?; Jul. 24, 2015; developers.google.com; pp. 1-8.*
Greten Vicke Estella; Using Google more efficiently part IV: domain specification; May 3, 2013; ititser.hub.ph; pp. 1-5.*
Google Developers Forum Reference Article: "Email Markup", Published on: Oct. 7, 2015, pp. 1-11, Available at: https://developers.google.com/gmail/markup/reference/flight-reservation#b-oarding_pass.*
YouTube Video: "Google Gmail One Button Action—myERP", Published on: May 15, 2013, pp. 1-5, Available at: https://www.youtube.com/watch?v=W9FInINAJ3A.*
Josh Hill; Subscription Management Basics for Marketo; Sep. 9, 2012; Marketing Rockstar Guides; 13 Pages.*
Berners-Lee et al.; Hypertext Markup Language—2.0; RFC 1866; Nov. 1995; Internet Engineering Task Force; pp. 1-77.*
"Hyperlink;" Microsoft Computer Dictionary; May 1, 2002; Microsoft Press; Fifth Edition; pp. 260-261.*

* cited by examiner

PROVIDING ACTION ASSOCIATED WITH EVENT DETECTED WITHIN COMMUNICATION

RELATED APPLICATIONS

This application is a continuation of U.S. patent application Ser. No. 15/197,765, filed Jun. 30, 2016, the entire content of which is hereby incorporated by reference.

BACKGROUND

Information collection, management, and analysis have changed work processes associated communication management. Automation and improvements in work processes have expanded scope of capabilities offered by businesses. With the development of faster and smaller electronics, execution of mass processes at consumption analysis systems have become feasible. Indeed, analysis work at data centers, data warehouses, data workstations have become common business features in modern work environments. Such systems execute a wide variety of applications ranging from enterprise resource management applications to complicated product tools. Many such applications process transaction related communications to attempt to improve interactions with a vendor. Email as a communication platform offers an intersect between purchases and events associated with the purchases.

Vast number of provider sources and product types complicate travel and/or product purchase. Indeed, fast changing dynamics of travel and/or product market may cause difficulties in managing travel and product related actions post purchase. Complications with multiple provider sources, product types, and complexity of the travel and/or product may lead to mismanagement of travel and/or product related communication. Lack of automation to control, manage, and/or modify a purchase of a product and/or travel related item (detected in a communication) unnecessarily burdens recipient actions related to the product and/or travel related item.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing an action associated with an event detected within a communication. A communication service, according to embodiments, may initiate operations to provide the action associated with the event by processing a communication to detect an event related to a transaction between a recipient and a vendor. Next, an action template matching the event type and the vendor is located. An action is generated by populating the action template with an attribute of the event. The action is provided to the recipient to facilitate an interaction related to the event with a vendor service.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a communication service may provide an action associated with an event detected within a communication. In an example scenario, the communication service may process a communication to detect an event related to a transaction between a recipient and a vendor. The event may include a confirmation action, and/or a tracking action, among others associated with a transaction that includes a travel related purchase, and/or a product related purchase, among others. The recipient may include a person and/or a group, among others directed to receive the communication. The vendor may include a company, a group, a store, and/or similar ones who are in commerce to sell or provide a product, an item, and/or a travel related item (such as airfare), among others.

The communication service may locate an action template matching an event type. The event type may describe a classification associated with the event such as a confirmation, and/or a tracking, among others. The action template may include a stencil with section(s) to insert the attribute of the event to generate an action. An example may include a uniform resource locator (URL) template that has section(s) to insert the attribute such as a transaction identifier (for example: a booking reference code). Next the action may be generated by populating the action template with the attribute of the event. The attribute may be placed in a section of the template that corresponds to the attribute (for example: a booking reference code may inserted into a section that corresponds to the booking reference code).

The action may also be provided to the recipient to facilitate an interaction related to the event with a vendor service. For example, the action may be transmitted to a client application, in use by the recipient, with instructions to prompt the client application to apply the action using a vendor service. Upon application of the action, the event may be automatically completed (such as a check-in action related to a booking confirmation).

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide an action associated with an event detected within a communication. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1A:
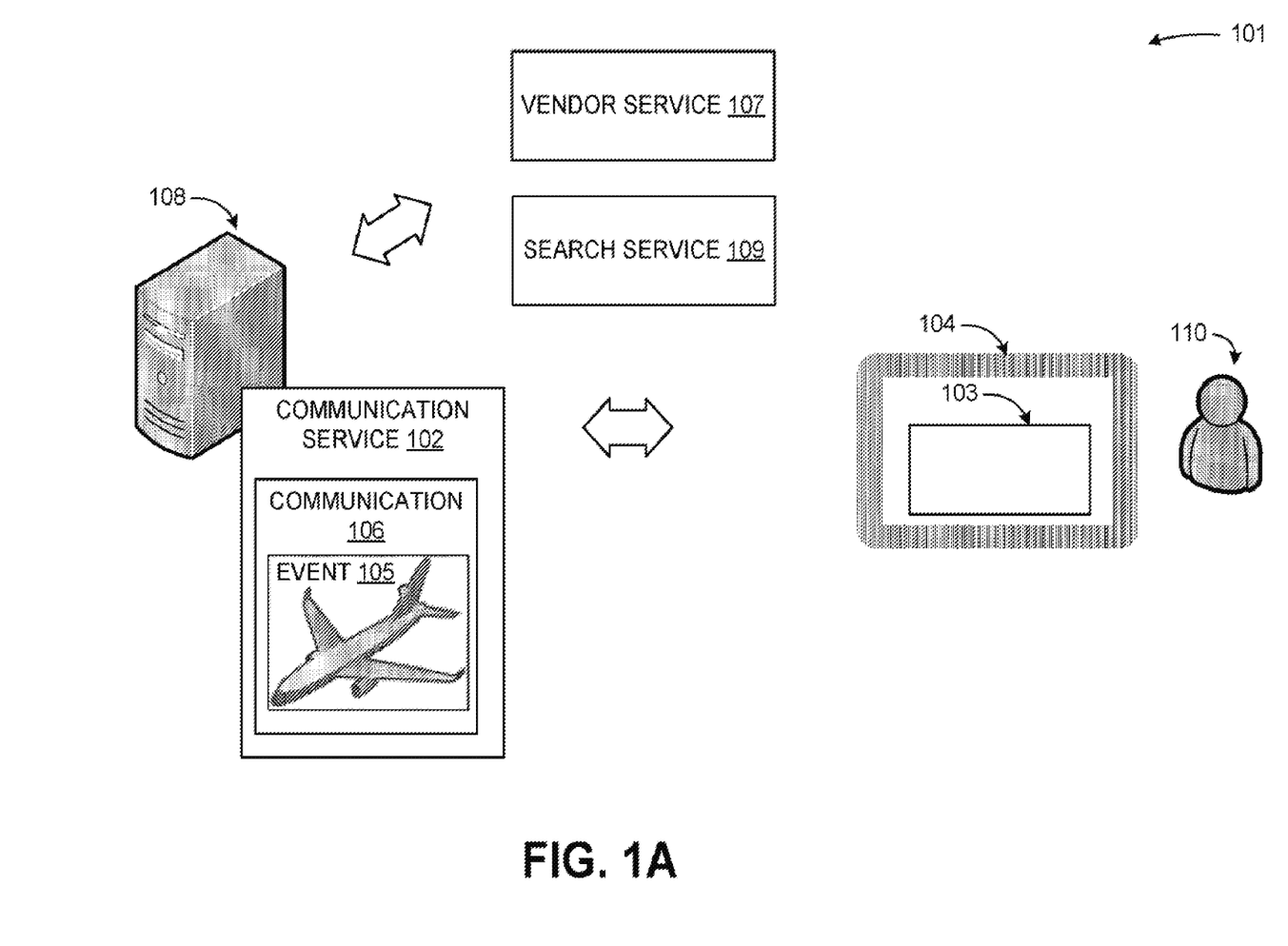
FIG. 1A through 1B are conceptual diagrams illustrating examples of providing an action associated with an event detected within a communication, according to embodiments.
Figure 1B:
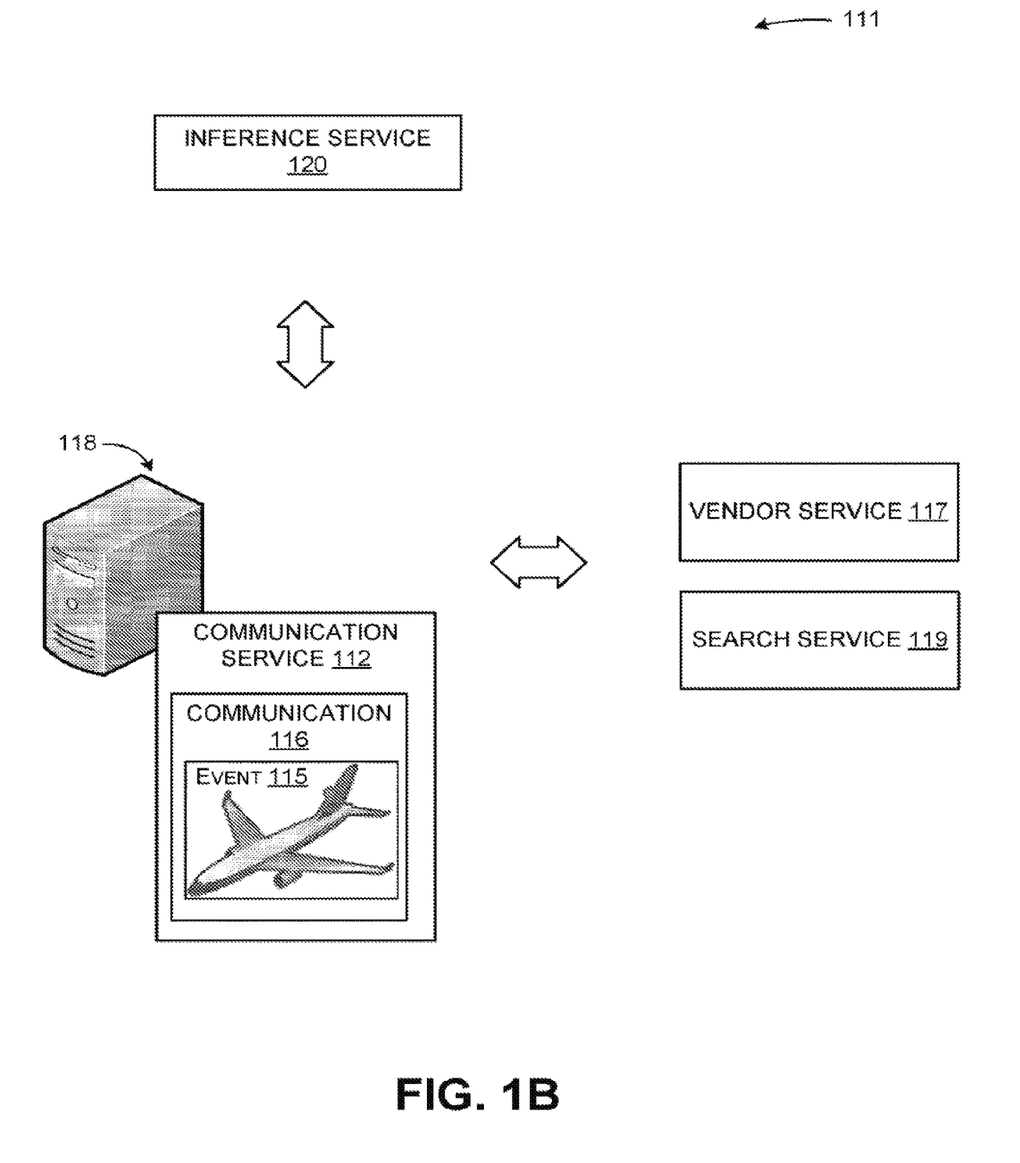

FIG. 1A through 1B are conceptual diagrams illustrating examples of providing an action associated with an event detected within a communication, according to embodiments.

In a diagram 101, a server 108 may execute a communication service 102. The server 108 may include a physical server providing service(s) and/or application(s) to client devices. A service may include an application performing operations in relation to a client application and/or a subscriber, among others. The server 108 may include and/or is part of a workstation, a data warehouse, and/or a data center, among others.

The server 108 may execute the communication service 102. The communication service 102 may initiate operations to provide an action associated with an event 105 by processing a communication 106 to detect the event 105. The communication 106 may include an email, a message, a conference call, an audio communication, and/or video communication, among others. The examples of communication were provided as an exemplary set of communication modalities. The previous communication examples were not provided in a limiting sense. Indeed other communication modalities may also be used to provide the communication 106.

The event 105 may be related to a transaction between a recipient 110 and a vendor (such as a company, a group, and/or a small business, among others providing a product, an item, and/or a travel related item, among others for commerce). In the example configuration of FIG. 1A, the event 105 may include a confirmation action and/or a tracking action, among others associated with a transaction such as a travel related purchase, and/or a product related purchase, among others. For example, the communication 106 may be analyzed to identify a check-in action (identified as the event 105) related to a flight reservation (identified as the transaction).

The attribute of the event 105 may include a recipient identifier (such as a first name, a last name, an email address, and/or a social networking credential, among others) associated with a recipient 110. The attribute may also include a transaction identifier (such as a booking reference code, a tracking number, an order number, and/or similar ones). Next, an action template matching an event type and the vendor may be located. The event type may include a classification associated with the event (such as a confirmation, and/or a tracking, among others). In an example scenario, a search service 109 may be queried with a name and/or a description of the vendor to locate a vendor service 107. The vendor service 107 may be queried for the action template. Alternatively, the action template may be retrieved from an internal data source.

Next, an action may be generated by populating the action template with the attribute of the event 105. The action may include a hyperlink that is constructed from the action template provided from the vendor service 107 and an attribute (such a booking reference code). The attribute is placed in a section of the action template associated with the attribute.

Furthermore, the action may be provided to the recipient 110. In an example scenario, the action may be transmitted to a client application 103 (that is currently in use by the recipient 110) to prompt the client application 103 to display the action to the recipient on a client device 104. For example, the client application 103 may be instructed to open a hyperlink to a webpage of the vendor service 107. The hyperlink may be customized to include the booking reference code (as the attribute). The hyperlink may be applied as the action because upon a rendering action, the webpage associated with the hyperlink may be populated with the attribute used to customize the hyperlink. As such, the hyperlink may be used to complete (wholly or partially) the event such as a check-in action.

The server 108 may communicate with the client device 104 through a network. The network may provide wired or wireless communications between nodes such as the client device 104, or the server 108, among others. Previous example(s) to provide an action associated with an event detected within a communication are not provided in a limiting sense. Alternatively, the communication service 102 may manage the communication 106 at a desktop application, a workstation application, and/or a server application, among others. The client application may also include a client interface of the communication service 102.

The recipient 110 may interact with the client application 103 with a keyboard based input, a mouse based input, a voice based input, a pen based input, and a gesture based input, among others. The gesture based input may include one or more touch based actions such as a touch action, a swipe action, and a combination of each, among others.

In a diagram 111 of FIG. 1B, the communication service 112 (executing in a server 118) may interact with an inference service 120 to process the communication 116 to detect an event 115 related to a transaction between a recipient and the vendor. The inference service 120 may include a third party service provider. Furthermore, the inference service 120 may execute operations to provide an action to the recipient to facilitate an interaction related to the event 115 with a vendor service 117. The search service 119 may be queried by the communication service 112, alternatively by the inference service 120, to locate the vendor service 117.

The communication service 112 may remove private information from any interaction with the inference service 120 to anonymize data transmitted to the inference service 120. The inference service 120 may locate an action template matching an event type and the vendor by querying the vendor service 117. An action may be generated by populating the action template with an attribute of the event. The inference service 120 may provide the action to the recipient. Alternatively, the inference service 120 may return the action to the communication service 112 for a presentation to the recipient.

While the example systems in FIG. 1A through 1B have been described with specific components including the server 108, the communication service 102, embodiments are not limited to these components or system configurations and can be implemented with other system configuration employing fewer or additional components.

Figure 2:
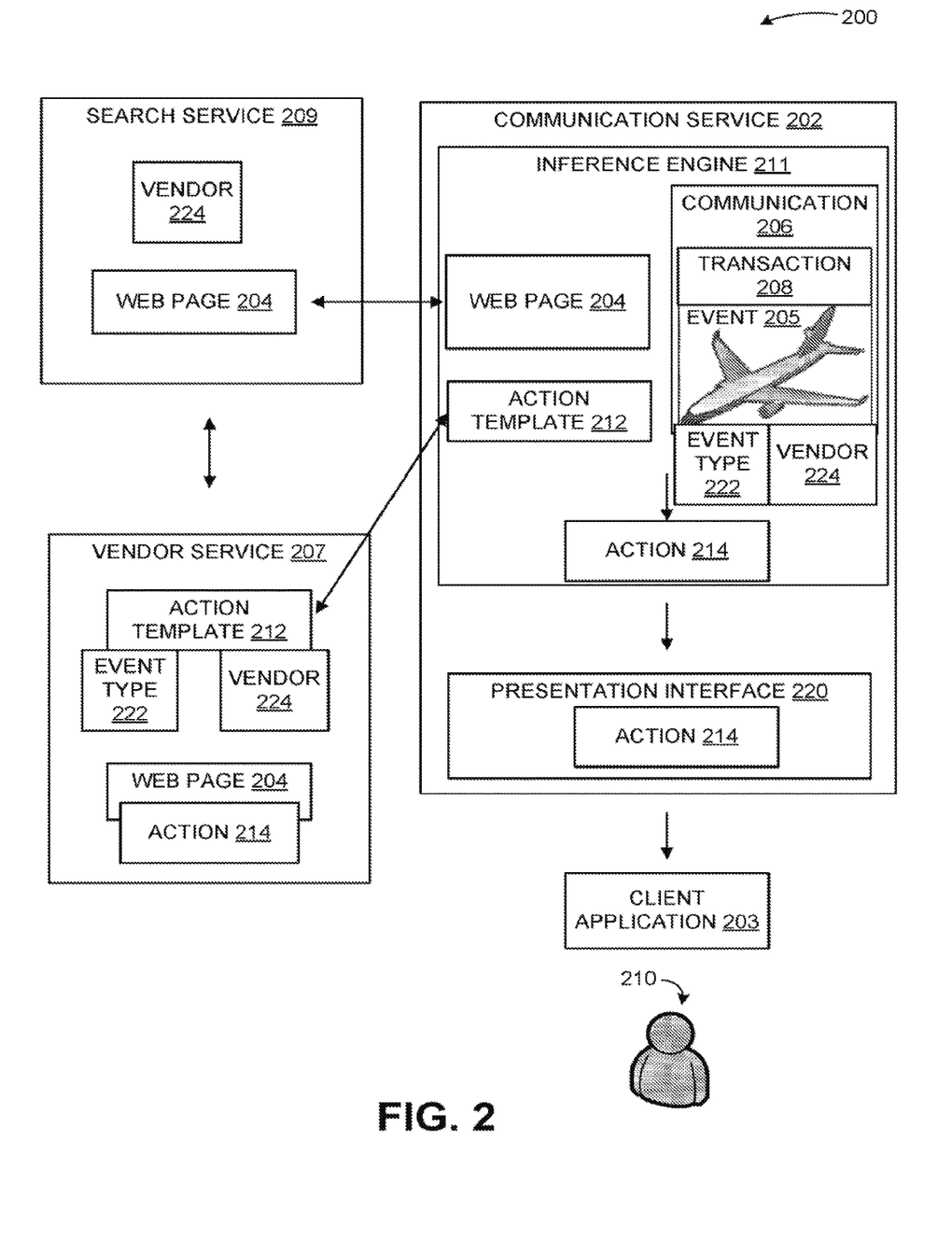
FIG. 2 is a display diagram illustrating example components of a communication service that provides an action associated with an event detected within a communication, according to embodiments.

FIG. 2 is a display diagram illustrating example components of a communication service that provides an action associated with an event detected within a communication, according to embodiments.

In a diagram 200, a communication service 202 may provide an action 214 associated with an event 205 detected within a communication 206. In an example scenario, an inference engine 211 of the communication service 202 may initiate operations to provide the action 214 by processing the communication 206 to detect an event 205 related to a transaction 208 between a recipient 210 and a vendor 224 (such as a name and/or a description of the vendor). The event 205 may include a confirmation action, and/or a tracking action, among others related to the transaction 208. The transaction 208 may include a travel related purchase, a purchase of a product or an item, and/or similar ones. The communication 206 may be processed with a natural language processing scheme to identify the event 205, the transaction 208, an event type 222 associated with the event 205, and/or a vendor 224, among others. Keyword candidates located in the communication 206 may be processed against known events, transaction, event types, and/or vendors from a data source to identify the event 205, the transaction 208, the event type 222.

The inference engine 211 may next attempt to locate an action template 212 that matches the event type 222 and the vendor 224. The event type 222 may include a classification of the event 205 such as a confirmation, and/or a tracking, among others. The vendor 224 may include a description of a company, a person, a group, a store, and/or similar ones in commerce to sell a travel related item, a product, and/or similar ones. The inference engine 211 may query a search service 209 with the vendor 224 to find a webpage 204 of a vendor service 207. Next, the inference engine 211 may query the vendor service 207 using the webpage 204 to find the action template 212 matching the event type 222 and the vendor 224. Alternatively, the inference engine 211 may query a local data source to locate the action template 212 that matches the event type 222 and the vendor 224.

The inference engine 211 may receive the action template 212 from the vendor service 207 thus confirming a successful find by the vendor service 207. The action template 212 may include a stencil, an outline with placeholders, and/or sections that match an attribute of the event 205. For example, a uniform resource locator (URL) may be used as an action template 212 with sections that may be available to insert the attribute of the event 205. The attribute may include a recipient identifier and/or a transaction identifier, among others.

The inference engine may generate an action 214 from the action template 212 by populating the action template 212 with the attribute of the event 205. For example, the URL may be populated with a booking reference code (identified as the attribute) to generate the action 214. A presentation interface 220 may then provide the action 214 to a client application 203 for a presentation to the recipient.

For example, the client application 203 may be instructed to apply the action 214 to the webpage 204. Applying the action 214 may include populating the webpage 204 with the attribute of the event 205. Specifically, the client application 203 may be instructed to open a customized URL (customized with the attribute of the event 205) to populate the webpage 204 (such as a check-in website for a flight) with the attribute (such as a booking reference code). As such, the client application 203 is instructed by the presentation interface 220 to complete the event 205 (such as a check-in action) partially or wholly.

Figure 3:
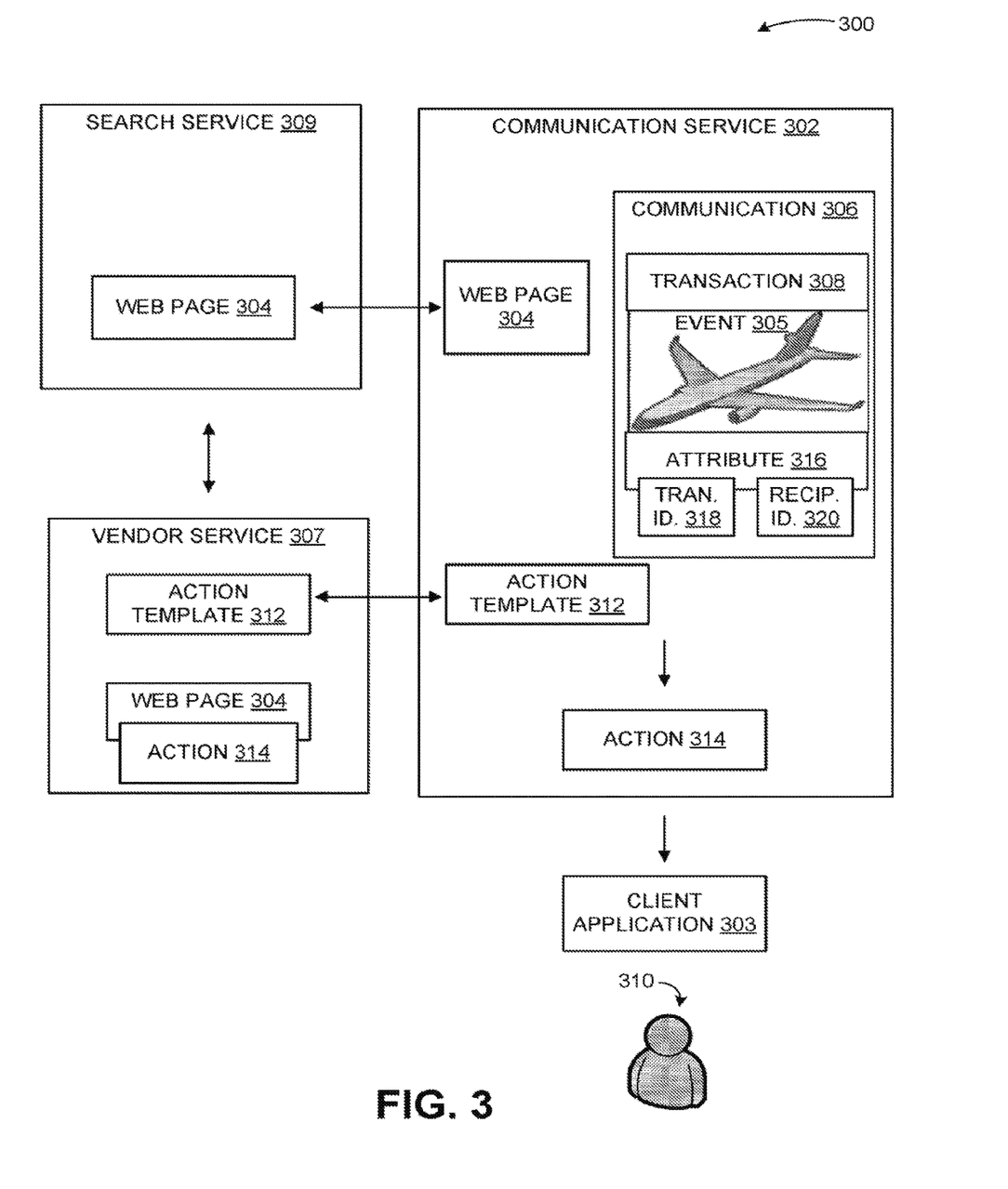
FIG. 3 is a display diagram illustrating components of a scheme to provide an action associated with an event detected within a communication, according to embodiments.

FIG. 3 is a display diagram illustrating components of a scheme to provide an action associated with an event detected within a communication, according to embodiments.

In a diagram 300, a communication service 302 may provide an action 314 associated with an event 305 detected within a communication 306. The communication service may process the communication 306 to detect the event 305. The event 305 may be related to a transaction 308 between a recipient 310 and a vendor. An action template 312 may also be located by matching an event type and the vendor to the action template 312.

The action 314 may be generated by populating the action template 312 with a transaction identifier 318 or a recipient identifier 320 (recognized as an attribute of the event 305). The action 314 may be provided to a recipient to facilitate an interaction with a vendor service 307. The interaction may include an application of the action 314 to a webpage 304 of the vendor service 307. In an example scenario, the action 314 may be provided to a client application 303 with an instruction for the client application 303 to apply the action 314 to the webpage 304 of the vendor service 307. For example, the action 314 may be applied to the webpage 304 to populate the webpage 304 with the transaction identifier 318 or the recipient identifier 320. As a result, the event 305 may be partially or wholly completed.

Alternatively, the communication service 302 may detect a notification of a failure to locate the action template 312. For example, the communication service 302 may receive a failure notification from the vendor service 307. Alternatively, a local data source searched for the action template 312 may also return a failure notification. In response to the failure notification, the communication service 302 may query a search service 309 with the event type and the vendor to locate a webpage of the vendor service associated with the event 305. An address of the webpage may be received from the search service 309. Next, the webpage may be accessed (through the received address) and analyzed to identify whether the webpage accepts an autofill input.

If the webpage is confirmed as configured to accept the autofill input, the communication service 302 may wait for a notification from the client application 303 that describes the recipient 310 interacting with the communication 306. The client application 303 may be instructed to apply the action 314 while an attention of the recipient 310 is in the communication 306 associated with the event 305. Upon receiving the notification, the communication service 302 may prompt the client application 304 to display the webpage 304 of the vendor (for example through a web browser) to the recipient 310. And, the client application 303 may be instructed to auto-fill (the action 314) the webpage 304 with the attribute (such as a booking reference code).

In another alternative scenario, the communication service 302 may query the search service 309 to locate the webpage 304 of the vendor after detecting a failure to locate the action template 312. In such a scenario, an address of the webpage 304 may again be received from a search service 309. The webpage 304 may be accessed and analyzed to determine whether the webpage 304 supports an autofill input. If the webpage is non-compliant and does not support autofill then the communication service 302 may generate an event summary card such as the event summary card 420 in FIG. 4. The event summary card may include a description of the event 305, the attribute 316 of the event 305, the event type, and the vendor. The client application 303 may be instructed to display the event summary card and alert the recipient to fill-in the webpage 304 of the vendor service 307 with section(s) of the event summary card.

In another example, the communication service 302 may identify a time period to complete the event 305. Upon detecting a start of the time period (or a current time as within the time period) the client application 303 may be instructed to display the action 314 to the recipient 310. For example, the communication service 302 may alert the recipient 310 to a start of a check-in time period (such as 24 hours) to apply the action 314 to the webpage 304 (such as an airline check-in site).

In yet another example, after a failure to locate the action template 312, the webpage 304 of the vendor service 307 may be located by querying the search service 309 with the event type and the vendor. The vendor service 307 may be accessed to retrieve the webpage 304. The webpage 304 may be analyzed to map the recipient identifier 320 and/or the transaction identifier 318 to associated component(s) in the webpage 304. Next, the associated component(s) may be automatically filled with the transaction identifier 318 and/or the recipient identifier 320.

For example, the communication service 302 may analyze a tracking webpage of a delivery company to identify a tracking number section in the tracking webpage. A tracking number (as the transaction identifier 318) may be mapped to the tracking number section and the tracking number section may be automatically filled (the action 314) with the tracking number. The client application 303 may be instructed to display the tracking webpage with the tracking number filled into the tracking number section.

In another example, the communication service 302 may receive a notification from the client application 303. The notification may describe a detected input (such as a search) associated with the event 305. The communication service 302 may interpret the interaction associated with the event 305 as an interest in the event 305. As such, the client application 303 may be instructed to display the action 314 to the recipient.

Figure 4:
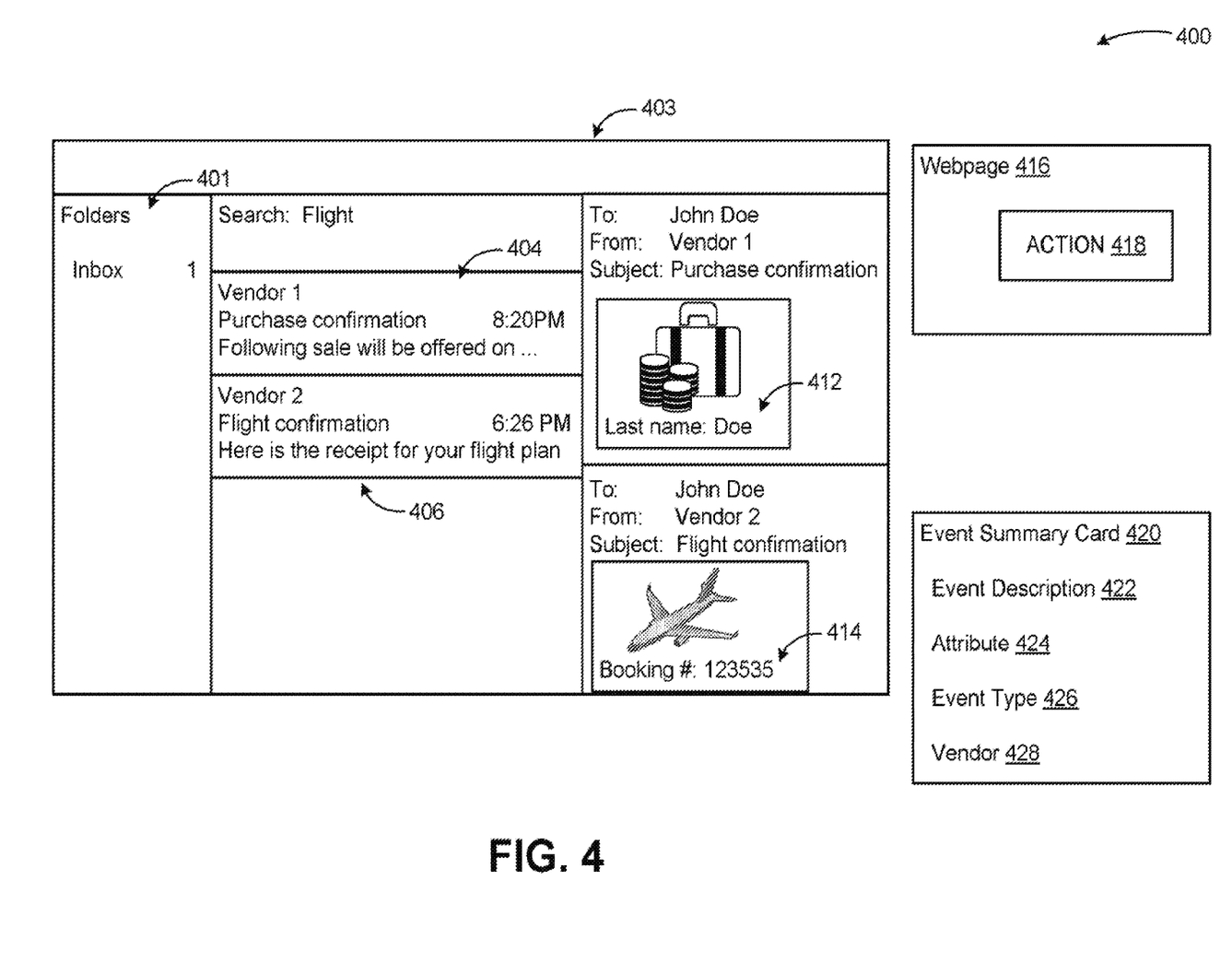
FIG. 4 is a display diagram illustrating an example of an interface that simulates an application of an action associated with an event on a webpage of a vendor service, according to embodiments.

FIG. 4 is a display diagram illustrating an example of an interface that simulates an application of an action associated with an event on a webpage of a vendor service, according to embodiments.

In a diagram 400, a communication service may provide an interface to be rendered by the client application 403 or provide data to be displayed by the interface of the client application 403 (such as a communication application). The client application 403 may provide navigation controls 401 to access and control view(s) associated with communication(s). The communication service may provide the communications (404 and 406) to the client application 403 for a presentation to the recipient. The communication 404 may be analyzed to identify an event and an attribute such as a recipient identifier 412. An example of the recipient identifier 412 may include a last name of the recipient. The communication 406 may be processed to identify another event and another attribute such a transaction identifier 414. The transaction identifier 414 may include a booking reference code associated with a flight.

The client application 403 may also be instructed to apply the action 418 to a webpage 416 of the vendor. An example of applying the action 418 may include auto-filling the transaction identifier and/or the recipient identifier to associated section(s) of the webpage 416. Furthermore, the client application 403 may be instructed to display an event summary card 420 upon detecting the webpage 416 that is non-compliant with an auto-fill action. The event summary card 420 may include an event description 422, an attribute 424 of the event (such as the transaction identifier and/or the recipient identifier), an event type 426, and/or a vendor 428, among others.

As discussed above, the communication service may be employed to perform operations to automate providing an action associated with an event detected within a communication. An increased user efficiency with the client application may occur as a result of processing a communication through the communication service 102 and identifying an event and an action (associated with the event) to interact with the vendor service 107. Natural language processing may be applied to the communication to identify the event, the transaction, the event type, and/or the vendor. Additionally, processing the communication and the event, by the communication service 102, may reduce processor load, increase processing speed, conserve memory, and reduce network bandwidth usage.

Embodiments, as described herein, address a need that arises from a lack of efficiency to provide action to manage an event detected within a communication. The actions/operations described herein are not a mere use of a computer, but address results that are a direct consequence of software used as a service offered to large numbers of users and applications.

The example scenarios and schemas in FIG. 1A through 4 are shown with specific components, data types, and configurations. Embodiments are not limited to systems according to these example configurations. Providing an action associated with an event detected within a communication may be implemented in configurations employing fewer or additional components in applications and user interfaces. Furthermore, the example schema and components shown in FIG. 1A through 4 and their subcomponents may be implemented in a similar manner with other values using the principles described herein.

Figure 5:
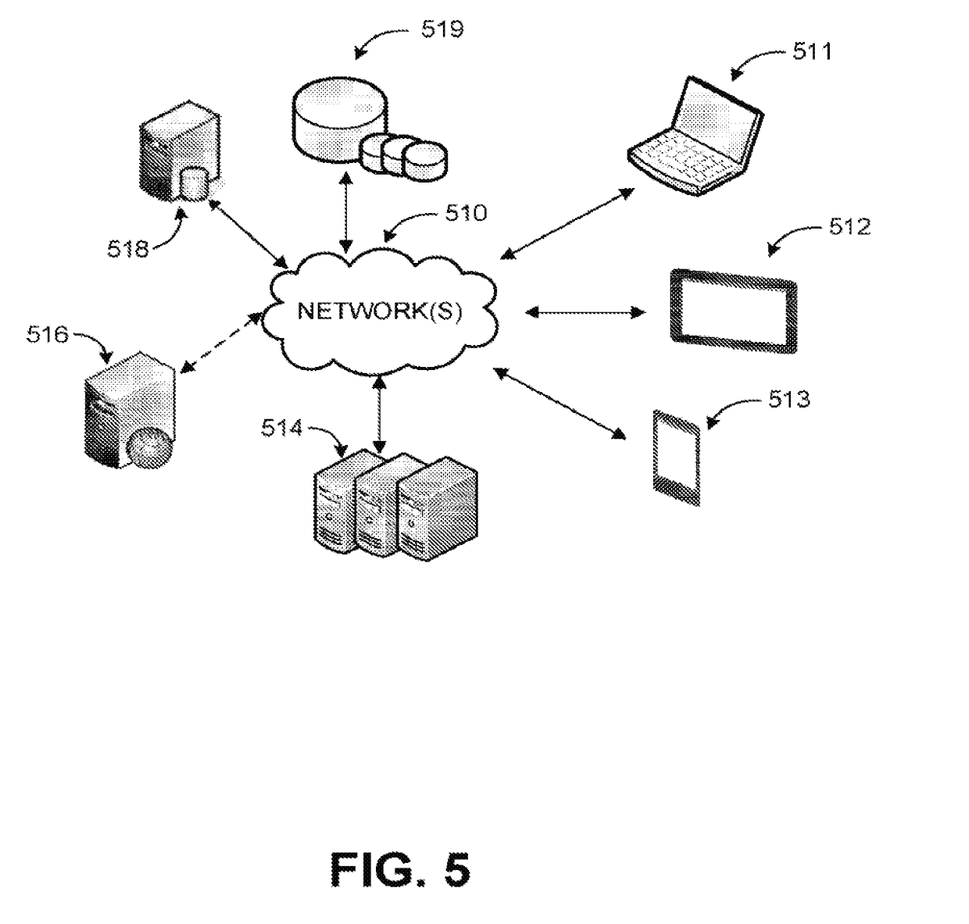
FIG. 5 is a simplified networked environment, where a system according to embodiments may be implemented.

FIG. 5 is an example networked environment, where embodiments may be implemented. A communication service configured to provide an action associated with an event detected within a communication may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication service may process the communication to detect an event related to a transaction between a recipient and a vendor. An action template may be located by matching an event type and a vendor. Next, an action may be generated by populating the action template with an attribute of the event (such as a transaction identifier and/or a recipient identifier). The action may be provided to the recipient to facilitate an interaction related to the event with a vendor service. The communication application may store data associated with the event in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide an action associated with an event detected within a communication. Furthermore, the networked environments discussed in FIG. 5 are for illustration purposes only. Embodiments are not limited to the example applications, modules, or processes.

Figure 6:
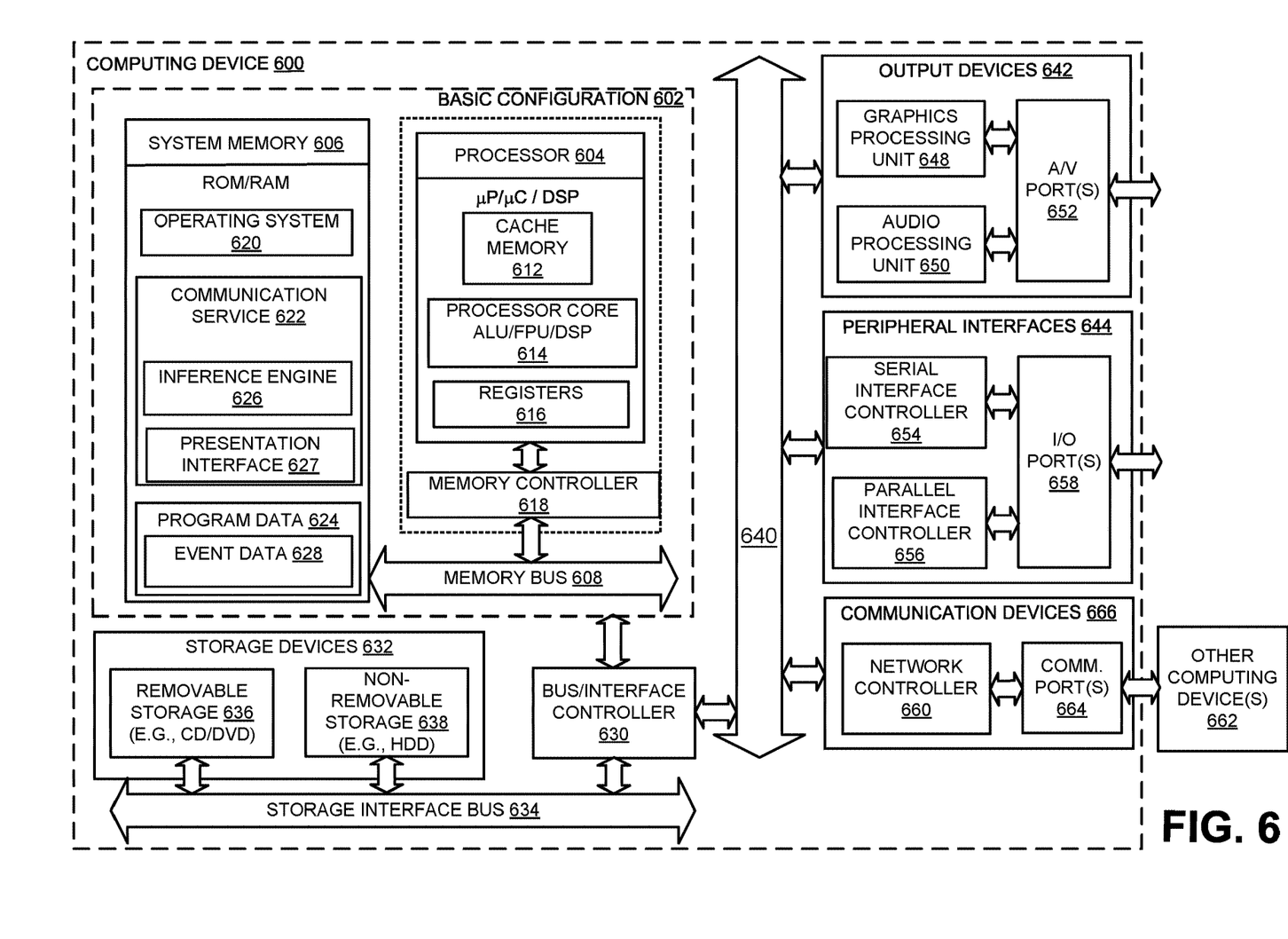
FIG. 6 is a block diagram of an example computing device, which may be used to provide an action associated with an event detected within a communication, according to embodiments.

FIG. 6 is a block diagram of an example computing device, which may be used to provide an action associated with an event detected within a communication, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication service 622, and a program data 624. The communication service 622 may include components such as an inference engine 626 and a presentation interface 627. The inference engine 626 and the presentation interface 627 may execute the processes associated with the communication service 622. The inference engine 626 may process the communication to detect an event related to a transaction between a recipient and a vendor. An action template may be located by matching an event type and a vendor. Next, an action may be generated by populating the action template with an attribute of the event (such as a transaction identifier and/or a recipient identifier). The presentation interface 627 may provide the action to the recipient to facilitate an interaction related to the event with a vendor service.

Input to and output out of the communication application 622 may be transmitted through a communication device associated with the computing device 600. An example of the communication device may include a networking device that may be communicatively coupled to the computing device 600. The networking device may provide wired and/or wireless communication. The program data 624 may also include, among other data, event data 628, or the like, as described herein. The event data 628 may include a recipient identifier and/or a transaction identifier, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide an action associated with an event detected within a communication. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
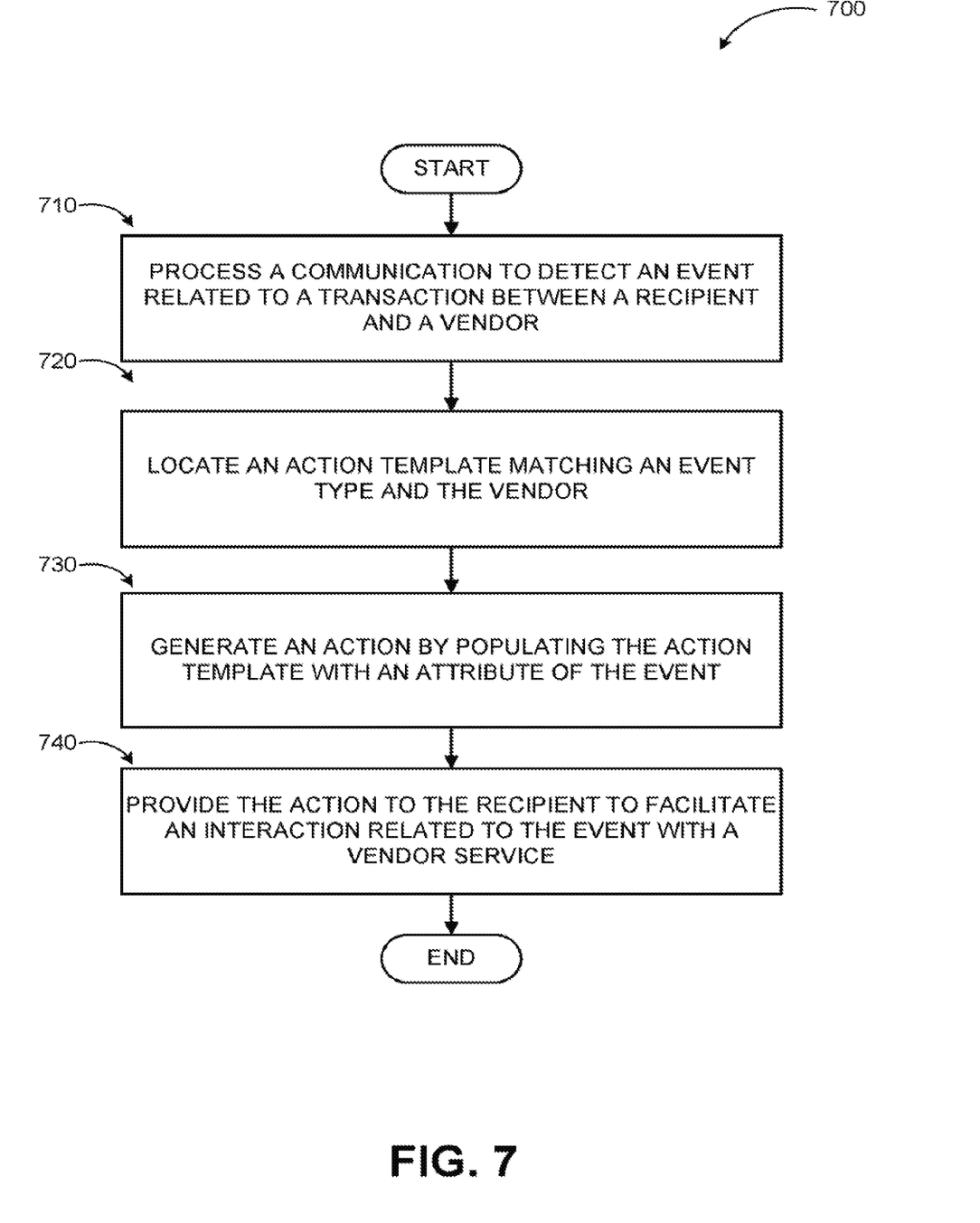
FIG. 7 is a logic flow diagram illustrating a process for providing an action associated with an event detected within a communication, according to embodiments.

FIG. 7 is a logic flow diagram illustrating a process for providing an action associated with an event detected within a communication, according to embodiments. Process 700 may be implemented on a computing device, such as the computing device 600 or another system.

Process 700 begins with operation 710, where the communication service processes a communication to detect an event related to a transaction between a recipient and a vendor. The event may include a confirmation action and/or a tracking action related to the transaction which may include a travel related purchase and/or a product related purchase. At operation 720, an action template may be located that matches an event type and a vendor. The action template may include a stencil with section(s) to insert attribute(s) associated with the event.

Next, at operation 730, an action may be generated by populating the action template with an attribute of the event. The action may include a customized URL pointing to a webpage of a vendor service. Upon application, the action may open the webpage and autofill section(s) of the webpage with attribute(s) associated with the event. At operation 740, the action may be provided to a recipient to facilitate an interaction related to the event with the vendor service.

The operations included in process 700 is for illustration purposes. Providing an action associated with an event detected within a communication may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a server to provide an action associated with an event detected within a communication is described. The server includes a communication device, a memory configured to store instructions associated with a communication service, and processor(s) coupled to the memory and the communication device. The processor(s) execute the communication service in conjunction with the instructions stored in the memory. The communication service includes an inference engine and a presentation interface. The inference engine is configured to process the communication to detect the event related to a transaction between a recipient and a vendor, locate an action template matching an event type and the vendor, and generate an action by populating the action template with an attribute of the event. The presentation interface is configured to provide, through the communication device, the action to the recipient to facilitate an interaction related to the event with a vendor service.

In other examples, the attribute includes a recipient identifier and a transaction identifier. The inference engine is further configured to insert the recipient identifier and the transaction identifier to associated positions in the action template to generate the action. The action includes a hyperlink generated from a uniform resource locator (URL) of a webpage of the vendor service, and wherein the URL is customized with the attribute that includes one or more of the event type, a recipient identifier, and a transaction identifier. The inference engine is further configured to include one or more instructions in the action to complete a portion of the event or an entirety of the event based on the attribute. The inference engine is further configured to query a search service to locate a webpage of the vendor service, receive the webpage of the vendor service, query the webpage of the vendor service with the event type to locate the action template, and receive the action template from the vendor service.

In further examples, the inference engine is further configured to detect a failure to locate the action template, query a search service with the event type and the vendor to locate a webpage of the vendor service, receive the webpage of the vendor service, and analyze the webpage of the vendor service to identify the webpage as configured to accept an autofill input. The presentation interface is further configured to receive a notification of the recipient interacting with the communication from a client application, prompt, through the communication device, the client application to display the webpage of the vendor service to the recipient, and instruct, through the communication device, the client application to auto-fill the webpage of the vendor service with the attribute.

In other examples, the inference engine is further configured to detect a failure to locate the action template, query a search service with the event type and the vendor to locate a webpage of the vendor service, receive the webpage of the vendor service, and analyze the webpage of the vendor service to identify the webpage as configured to reject an autofill input. The presentation interface is further configured to receive a notification of the recipient interacting with the communication from a client application, generate an event summary card that includes a description of the event, the attribute of the event, the event type, and the vendor, prompt, through the communication device, the client application to display the webpage of the vendor service to the recipient, and instruct, through the communication device, the client application to display the event summary card and alert the recipient to fill-in the webpage of the vendor service with one or more sections of the event summary card.

In some examples, a method executed on a computing device to provide an action associated with an event detected within a communication is described. The method includes processing an email to detect the event related to a transaction between a recipient and a vendor, locating an action template matching an event type and the vendor, generating the action by populating the action template with one or more of a recipient identifier and a transaction identifier of the event, and providing the action to the recipient to facilitate an interaction related to the event with a vendor service.

In other examples, the action includes one or more of a status confirmation and a status tracking related to the transaction that includes one or more of a travel related purchase and a product related purchase. The method further includes identifying a time period to complete the event, detecting a start of the time period, and instructing a client application to display the action to the recipient. The method further includes detecting a failure to locate the action template, querying a search service with the event type and the vendor to locate a webpage of the vendor service, and analyzing the webpage to identify other webpage of the vendor service, wherein the other webpage includes one or more components to accomplish the event. The method further includes mapping the recipient identifier and the transaction identifier to the one or more components, automatically filling the one or more components with the recipient identifier and the transaction identifier, and prompting a client application to display the other webpage to the recipient. The method further includes receiving a notification of the recipient providing an input associated with the event from a client application and instructing the client application to display the action to the recipient.

In some examples, a computer-readable memory device with instructions stored thereon to provide an action associated with an event detected within a communication is described. The instructions include actions that are similar to the actions of the method.

In some examples, a means for providing an action associated with an event detected within a communication is described. The means for providing an action associated with an event detected within a communication includes a means for processing the communication to detect the event related to a transaction between a recipient and a vendor, a means for locating an action template matching an event type and the vendor, a means for generating an action by populating the action template with an attribute of the event, and a means for providing the action to the recipient to facilitate an interaction related to the event with a vendor service.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:
1. A method executed on a computing device to provide an action associated with an event detected within a communication, the method comprising:
   during processing the communication, detecting the event within the communication, wherein the event is asso- ciated with one or more transactions between a recipient of the communication and a sender of the communication;

attempting to locate an action template corresponding to the one or more transactions based on matching at least one selected from the group consisting of an event type of the event and the sender to one of a plurality of action templates;

detecting a failure to locate the action template;

querying a search service with the event type and an identifier of the sender of the communication for a first webpage of the sender of the communication;

analyzing the first webpage located based on the querying;

identifying a second webpage of the sender of the communication based on the analyzing; and determining the action template based on the second webpage.

2. The method of claim 1, further comprising:

mapping recipient information and information associated with the event included in the communication to the action template determined based on the second webpage of the sender of the communication;

automatically filling the action template determined at the second webpage with the recipient information and the information associated with the event included in the communication; and providing the second webpage to a client application to be displayed to the recipient of the communication.

3. The method of claim 1, wherein the event is a first event, the communication is a first communication, and the method further comprises:

processing a second communication;

detecting a second event within the second communication, wherein the second event is related to a transaction between a recipient of the second communication and a sender of the second communication;

attempting to locate an action template corresponding to the transaction, between a recipient of the second communication and a sender of the second communication, based on matching at least one selected from the group consisting of an event type of the second event and the sender of the second communication to one of a plurality of action templates;

in response to locating the action template, generating an action by populating the action template based on recipient information and information associated with the second event included in the second communication; and in response to population of the action template, instructing a client application to open a webpage of the sender of the second communication and populate a fillable section of the webpage based on the action template.

4. The method of claim 3, wherein the action includes a hyperlink generated from a uniform resource locator (URL) of the webpage of the sender of the second communication, and wherein the URL includes one or more of the event type of the second event, an identifier of the recipient of the second communication, and an identifier of the transaction between a recipient of the second communication and a sender of the second communication.

5. The method of claim 1, wherein the event is a first event, the communication is a first communication, and the method further comprises:

processing a second communication;

detecting a second event within the second communication, wherein the second event is related to a transaction between a recipient of the second communication and a sender of the second communication;

attempting to locate an action template corresponding to the transaction, between a recipient of the second communication and a sender of the second communication, based on matching at least one selected from the group consisting of an event type of the second event and the sender of the second communication to one of a plurality of action templates;

in response to a failure to determine the action template, querying a search service for a searched webpage of the sender of the second communication;

receiving the searched webpage of the sender of the second communication;

analyzing the searched webpage of the sender of the second communication; and identify the searched webpage as configured to reject an autofill input based on results of analyzing the searched webpage of the sender of the second communication.

6. The method of claim 1, wherein the action template is a uniform resource locator (URL).

7. A computer-readable memory device with instructions stored thereon to provide an action associated with an event detected within a communication, the instructions comprising:

during processing the communication, detecting the event within the communication, wherein the event is associated with one or more transactions;

attempting to locate an action template corresponding to the one or more transactions based on matching at least one selected from the group consisting of an event type of the event and a sender of the communication to one of a plurality of action templates;

detecting a failure to locate the action template; and in response to detecting the failure to determine the action template,
querying a search service with the event type and an identifier of the sender of the communication for a first webpage of the sender of the communication,
analyzing the first webpage located based on the querying,
identifying a second webpage of the sender of the communication, wherein the second webpage includes one or more components associated with the event, and
providing the second webpage with the one or more components as filled to a client application to be displayed to a recipient of the communication.

8. The computer-readable memory device of claim 7, wherein the instructions further comprise:

querying a search service for a searched webpage of the sender of the communication;

identifying the searched webpage of the sender of the communication based on the querying of the search service;

querying the searched webpage of the sender of the communication with the event type; and receiving the action template from the sender of the communication based on the querying of the searched webpage.

9. The computer-readable memory device of claim 7, wherein the event is a first event, the communication is a first communication, and the instructions further comprise:

processing a second communication;

detecting a second event within the second communication, wherein the second event is related to a transaction between a recipient of the second communication and a sender of the second communication;

attempting to locate an action template corresponding to the transaction, between a recipient of the second communication and a sender of the second communication, based on matching at least one selected from the group consisting of an event type of the second event and the sender of the second communication to one of a plurality of action templates;

in response to locating the action template, generating an action by populating the action template based on recipient information and information associated with the second event included in the second communication; and in response to population of the action template, instructing a client application to open a webpage of the sender of the second communication and populate a fillable section of the webpage based on the action template.

10. The computer-readable memory device of claim 9, wherein the action includes a hyperlink generated from a uniform resource locator (URL) of the webpage of the sender of the second communication, and wherein the URL includes one or more of the event type of the second event, an identifier of the recipient of the second communication, and an identifier of the transaction between a recipient of the second communication and a sender of the second communication.

11. The computer-readable memory device of claim 7, wherein the event is a first event, the communication is a first communication, and the instructions further comprise:

processing a second communication;

detecting a second event within the second communication, wherein the second event is related to a transaction between a recipient of the second communication and a sender of the second communication;

attempting to locate an action template corresponding to the transaction, between a recipient of the second communication and a sender of the second communication, based on matching at least one selected from the group consisting of an event type of the second event and the sender of the second communication to one of a plurality of action templates;

in response to a failure to determine the action template, querying a search service for a searched webpage of the sender of the second communication;

receiving the searched webpage of the sender of the second communication;

analyzing the searched webpage of the sender of the second communication; and identify the searched webpage as configured to reject an autofill input based on results of analyzing the searched webpage of the sender of the second communication.

12. A server to provide an action associated with an event detected within a communication, the server comprising:

a communication device;

a memory configured to store instructions associated with a communication service;

one or more processors coupled to the memory and the communication device, the one or more processors executing the communication service in conjunction with the instructions stored in the memory, wherein the one or more processors are configured to:

process the communication;

detect the event within the communication, wherein the event is related to a transaction between a recipient of the communication and a sender of the communication;

attempt to locate an action template corresponding to the transaction based on matching at least one selected from the group consisting of an event type of the event and the sender of the communication to one of a plurality of action templates; and in response to a failure to locate the action template:
query a search service for a searched webpage of the sender of the communication,
locate the searched webpage of the sender of the communication based on the query,
analyze the searched webpage of the sender of the communication, and
identify the searched webpage as configured to accept an autofill input based on results of analyzing the searched webpage of the sender of the communication.

13. The server of claim 12, wherein the one or more processors are further configured to:

in response to querying the search service for the searched webpage of the sender of the communication, receive the searched webpage of the sender of the communication.

14. The server of claim 13, wherein the one or more processors are further configured to:

query the searched webpage of the sender of the communication for the action template; and receive the action template from the searched webpage of the sender of the communication.

15. The server of claim 12, wherein the one or more processors are further configured to:

provide, through the communication device, the searched webpage of the sender of the communication to a client application to be displayed to the recipient; and instruct, through the communication device, the client application for auto-fill of the searched webpage of the sender of the communication.

16. The server of claim 12, wherein the one or more processors are further configured to:

generate an event summary card, wherein the event summary card includes a description of the event, an attribute of the event, the event type, and an identifier of the sender; and provide, through the communication device, the searched webpage of the sender of the communication, the event summary card, and an alert to the recipient to a client application to be displayed to the recipient, wherein the alert includes instructions for filling in the searched webpage of the sender of the communication with one or more sections of the event summary card.

17. The server of claim 12, wherein the event is a first event, the communication is a first communication, and the one or more processors are further configured to:

process a second communication;

detect a second event within the second communication, wherein the second event is related to a transaction between a recipient of the second communication and a sender of the second communication;

attempt to locate an action template corresponding to the transaction, between a recipient of the second communication and a sender of the second communication, based on matching at least one selected from the group consisting of an event type of the second event and the sender of the second communication to one of a plurality of action templates;

in response to locating the action template, generate an action by populating the action template based on recipient information and information associated with the second event included in the second communication; and in response to population of the action template, instruct, through the communication device, a client application to open a webpage of the sender of the second communication and populate a fillable section of the webpage based on the action template.

18. The server of claim 17, wherein the action includes a hyperlink generated from a uniform resource locator (URL) of the webpage of the sender of the second communication, and wherein the URL includes one or more of the event type of the second event, an identifier of the recipient of the second communication, and an identifier of the transaction between a recipient of the second communication and a sender of the second communication.

19. The server of claim 12, wherein the event is a first event, the communication is a first communication, and the one or more processors are further configured to:

process a second communication;

detect a second event within the second communication, wherein the second event is related to a transaction between a recipient of the second communication and a sender of the second communication;

attempt to locate an action template corresponding to the transaction, between a recipient of the second communication and a sender of the second communication, based on matching at least one selected from the group consisting of an event type of the second event and the sender of the second communication to one of a plurality of action templates;

in response to a failure to determine the action template, query a search service for a searched webpage of the sender of the second communication;

receive the searched webpage of the sender of the second communication;

analyze the searched webpage of the sender of the second communication; and identify the searched webpage as configured to reject an autofill input based on results of analyzing the searched webpage of the sender of the second communication.

20. The server of claim 12, wherein the action template is a uniform resource locator (URL).

* * * * *